United States Patent Office 3,077,286
Patented Feb. 12, 1963

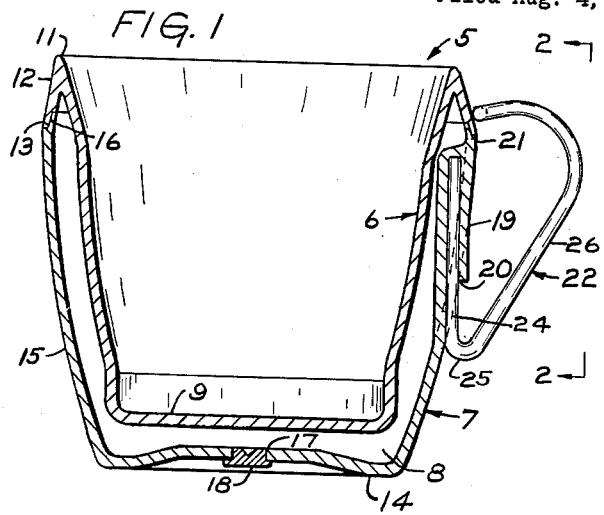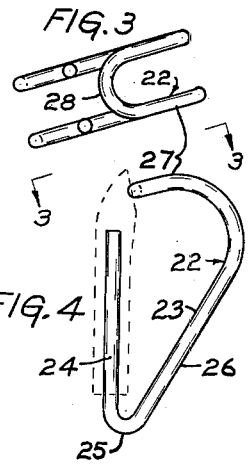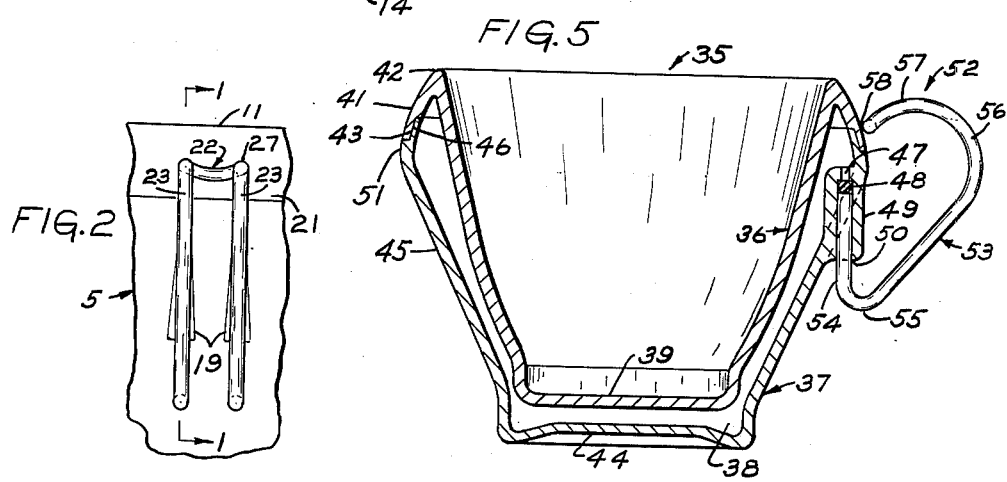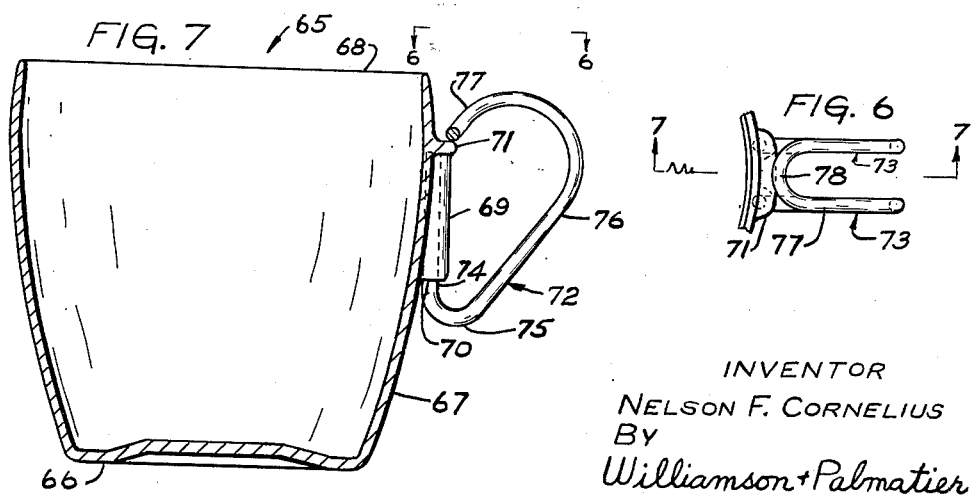

3,077,286
CONTAINER HANDLE CONSTRUCTION
Nelson F. Cornelius, 10334 Mississippi Blvd.,
Coon Rapids, Minn.
Filed Aug. 4, 1960, Ser. No. 47,418
3 Claims. (Cl. 220—94)

This invention relates generally to receptacles constructed at least for the most part of plastic material and more specifically to plastic receptacles having handle structure constructed for ready attachment and detachment therefrom.

An object of this invention is to provide a novel ornate plastic receptacle of simple and inexpensive construction.

Another object of this invention is to provide a novel ornate receptacle formed of plastic material and including a handle structure arranged and constructed for ready attachment to the receptacle.

Another object of this invention is to provide a novel receptacle formed of plastic material and having a metallic handle structure arranged and constructed to cooperatively engage the receptacle and to be frictionally interlocked therewith thus obviating the need of attachment means such as bolts, rivets, or cementitious material.

A still further object of this invention is to provide a highly efficient, ornate receptacle structure formed of plastic material and comprising a spaced double wall plastic shell structure formed of a thermo-plastic material, the outermost wall surface having a preformed socket integrally formed therewith for cooperatively engaging and interlocking a handle structure in a more efficient manner than any heretofore known comparable devices.

These and other objects and advantages of my invention will more fully appear from the following description made in connection with the accompanying drawings wherein like character references refer to the same or similar parts throughout the several views, and in which:

FIG. 1 is a vertical, sectional view of my invention taken approximately along line 1—1 of FIG. 2 and looking in the direction of the arrows;

FIG. 2 is a rear fragmentary elevational view of my invention taken approximately along line 2—2 of FIG. 1 looking in the direction of the arrows;

FIG. 3 is a top plan view of the handle structure taken approximately along line 3—3 of FIG. 4 and looking in the direction of the arrows;

FIG. 4 is a side elevational view of the handle structure, with parts of the receptacle being illustrated by dotted line configuration;

FIG. 5 is a vertical cross-sectional view of a different embodiment of my invention;

FIG. 6 is a fragmentary plan view of still a further embodiment of my invention taken approximately along line 6—6 of FIG. 7 and looking in the direction of the arrows; and FIG. 7 is a vertical cross-sectional view taken approximately along line 7—7 of FIG. 6 and looking in the direction of the arrows.

Referring now to the drawing and more specifically to FIGS. 1 to 4, it will be seen that one embodiment of my invention includes a double wall container 5 which, as illustrated, is in the form of a cup-type receptacle. This cup 5 is comprised of inner and outer shells indicated as entireties by the numerals 6 and 7 respectively each of which is molded from high heat resisting grades of plastic which when molded are hard and substantially rigid. In this connection, thermo-plastic material such as, for example, a copolymer of polystyrene and acrylonitrile may be successfully utilized and the outermost shell 7 may be transparent in the manner of the receptacle defined in my co-pending application, Serial No. 798,228. These shells 6 and 7 may be constructed from thermo-setting plastics for molding the shells by compression from suitable thermo-setting materials such as phenolics, melamines, or the like. Referring now to FIG. 1, it will be seen that the inner and outer shells 6 and 7 have their respective walls disposed in concentric, spaced relation thereby defining an insulating chamber 8 therebetween.

It will be noted that the inner shell 6 is provided with a bottom 9 having annular peripheral walls diverging upwardly therefrom and terminating upwardly in an annular rim 11. Depending flanges 12 extend outwardly and downwardly from the upper marginal portion of the inner shell 6 and terminate in abutment edges 13 which, as seen in FIG. 1, adapted to abut and interlock with corresponding abutment edges on the outer shell 7.

The outermost shell 7 is also provided with a bottom wall 14 having annular peripheral wall 15 extending upwardly therefrom, the peripheral walls terminating upwardly in an annular abutment edge 16 which is engageable with the abutment edge 13 of the inner shell 6 in complementary abutting relation. If the outer shell is transparent, the inner surface may be provided with a thin layer of reflective, preferably metallic material such as bronzing lacquer or metal applied through the utilization of a vacuum metalizing process or by an application and adherence of a thin metallic foil to form such a coating. The abutment edges 13 and 16 of the inner and outer shell respectively are cemented together in a manner defined in my co-pending application, Serial No. 798,228, and the assembled parts are thereafter baked to enable the cement to thoroughly harden and weld the section together. In order to permit the cement softened vapors to escape chamber 8 between the inner and outer shells, the outermost shell is provided with an aperture 17 in the bottom wall 14 thereof to permit the gaseous material to escape therethrough. A small plug 18 may be used to close the venting aperture 17 after the assembly of the two units.

Before my invention, the prior art directed to molded plastic containers such as cups quite often had the handle structures of the cup integrally formed with the wall of the cup during the molding operation. The cups formed in this manner not only had handles which were somewhat structurally weak but the overall appearance of the cup was marred because the molds utilized were necessarily comprised of separable halves. The parting line defined by these separable mold members not only detracted from the overall appearance of the resulting cup or receptacle but such molds are highly expensive. To this end I have provided a cup having a novel handle structure which not only enhances the appearance and overall ornamental effect of the receptacle but is cooperatively interlocked with the cup to provide a more efficient and stronger structure.

Referring now to FIGS. 1 and 2, it will be seen that outer shell 7 is provided with a pair of spaced apart vertically extending socket members 19 each being of similar elongate configuration. The socket members 19 are positioned or spaced below the upper marginal portion of the cup 5 and each of the sockets is provided with an elongate, vertically extending recess or socket 20. It will be noted that the outermost wall surface of the assembled inner and outer shell actually diverges or flares upwardly from the base to an intermediate portion adjacent the upper marginal portion of the cup and thereafter converges to the annular rim 11 to thereby define an annular enlarged portion or bulge 21. It will be noted that this bulge 21 is spaced above each of the socket members 19, the function of which will be more fully explained hereinafter.

A handle for my novel cup is designated in its entirety by the reference numeral 22 and is preferably formed of a rigid metallic material which is bent to define a pair of identical handle elements 23. Handle 22 may be formed of brass or may be a brass-coated material or other metal which may be polished for ornamental effect. Each of the handle elements 23 includes a substantially vertically disposed socket engaging portion 24 each being adapted to be received within its associated socket or recess 20. The lowermost end of each of the socket-engaging portions 24 is arcuately bent as at 25 and is integrally formed with grasping or gripping portion 26 which extends upwardly and outwardly therefrom, as best seen in FIG. 1. The upper terminal parts 22 of the gripping portions 26 are arcuately bent and these terminal parts 27 are integrally joined to define a bight or joint 28 which is disposed closely adjacent the ends of the socket-engaging portion 24. It will be noted that when the socket-engaging portions 25 of each of the handle elements 23 are disposed within their associated socket or recess 20 and are completely seated therein, as illustrated in FIG. 1, terminal parts 27 of the gripping portions 26 and the bight 28 cooperatively slide over the annular bulge 21 so that the terminal parts 27 frictionally engage the outer surface of the cup in the manner of a snap coupling. With this arrangement, the handle 22 is firmly interlocked in place on the receptacle 5 in an over-center action with the greatest amount of bearing stress being imparted to the terminal parts of the gripping or grasping portions 26.

Referring now to FIG. 5, it will be seen that I have provided a different embodiment of my novel receptacle or cup and this receptacle designated in its entirety by the reference numeral 35 includes an inner and outer shell 36 and 37 respectively interconnected in substantially concentric relationship to define an insulating chamber 38 therebetween. Each of the inner and outer shells 36 and 37 are also formed of a plastic material in the manner of the embodiment of FIG. 1 and the innermost shell includes a bottom wall 39 having annular rim 41. This annular rim is provided with a depending annular flange integrally formed therewith, the flange 42 terminating in abutment edge 43.

The outer shell 37 is also provided with a bottom wall 44 having an annular peripheral wall 45 extending upwardly therefrom in flaring relation with the bottom and terminating in abutment edge 46.

The abutment edges 46 and 43 cooperatively engage each other in the manner of the embodiment of FIG. 1 and are cemented together, the process contemplating a baking step which necessitates venting of the double wall structure.

The outermost wall surface of the outer shell 37 is provided with a pair of socket members 49 (only one of which is shown) each having a downwardly opening socket or recess 20 formed therein. It will be noted that both the inner and outer shells 36 and 37 of the receptacle 35 flare outwardly a greater degree than the embodiment shown in FIGS. 1 and 2 so that a relatively pronounced bulge or enlarged portion 51 is defined just below the annular rim by the depending flange 42 and the upper marginal portion of the outer shell 37.

It will be seen that a small venting passage or orifice 47 extends between the insulating chamber 38 and the innermost extremities of the socket or recesses 50 and these orifices serve as a venting outlet to permit the escape of the gases which are created during the baking step. A small resilient compressible closure member 48 preferably formed of rubber material or the like may be positioned within the sockets or recesses 20 and retained therein by the handle structure for closing the venting orifices 47.

The handle structure 52 of substantially identical construction with the handle structure 22 of the embodiment of FIG. 1 is also bent to define a pair of handle elements 53 integrally formed together and preferably constructed of a metallic material. Each of the handle elements 53 includes a recess or socket-engaging portion 54 adapted to be received within the sockets or recesses 50, the lower terminal ends of the socket-engaging portions being arcuately bent as at 55 and integrally formed with the gripping or grasping portion 26; the terminal parts 57 of this gripping or grasping portion 56 are integrally joined as at 58 and these terminal parts 57 cooperatively engage the enlarged annular portion 51 to effect a snap coupling action therewith for effectively interlocking the handle 52 to the receptacle. This over-center locking of the handle of the embodiments of FIGS. 1 to 5 not only presents a strong yet ornamentally attractive handle structure but one which may be readily attached or detached from the receptacle. In this connection, it will be noted that this interlocking over-center relationship of the handle with respect to the receptacle obviates the need of interconnecting the handle by bolts, screws, cementitious material or the like.

Referring now to FIGS. 6 and 7, it will be seen that I have provided as a still further embodiment of my invention a single wall receptacle generally designated by the reference numeral 65 which is also preferably formed of a plastic material of the type defined in the embodiments of FIGS. 1 to 5. This cup is comprised of a bottom wall 66 having upstanding annular peripheral walls flaring upwardly and outwardly from the bottom wall, the peripheral walls 67 terminating in an annular rim or edge 68.

The receptacle 65 is also provided with a pair of vertically extending elongate socket members 69 each being disposed in spaced apart relation and each having an elongate vertically extending socket 70 formed therein. It will be noted that a socket or recess 70 are downwardly opening and that the socket members 69 are interconnected at their upper end by lip or seat 71 the function of which will be described hereinbelow.

The embodiment illustrated in FIGS. 6 and 7 is also provided with a handle designated in its entirety by the reference numeral 72 formed of an elongate piece of metal bent to define a pair of similar or identical handle elements 73. Each of these handle elements 73 includes a socket-engaging portion 74 adapted to be snugly seated within its associated socket or recess 70, each of the socket-engaging portions 74 being arcuately bent adjacent the lower terminal end and integrally formed with gripping or grasping portions 76 as best seen in FIG. 7. The gripping or grasping portions 76 extend upwardly and outwardly from the socket-engaging portions and the terminal parts 77 of these gripping portions are arcuately bent and are integrally joined as at 78, the terminal parts and bight portions 78 being engageable with a lip portion 71, as illustrated in FIG. 6. It will be seen that the terminal parts bight portion of the handle 72 effect a snap coupling interlocking action and this over-the-center locking relationship between the lip and the terminal parts of the handle-grasping portions effectively locks the handle to the receptacle.

It should be pointed out that the embodiment of FIG. 5 may also be provided with reflective coating on the inner surface of the outer shell 37 in the manner of the embodiment of FIG. 1 if it is so desired.

It will be seen from the foregoing description that I have provided a novel receptacle having an uniquely constructed handle arranged for ready connection to the receptacle. It will also be seen that my novel receptacle and handle are interlocked in a frictional over-center relation to provide the receptacle with a handle structure not only of attractive ornamental appearance but one which is of durable construction. Thus, it will be seen from the preceding paragraphs that I have provided a novel receptacle having a readily attachable handle arranged and constructed to effect a great savings in both time and material.

It will, of course, be understood that various changes may be made in the form, details, and arrangements and proportions of the various parts without departing from the scope of my invention.

What I claim is:

1. A receptacle for use in holding food and the like comprising a shell including a bottom having a peripheral wall extending upwardly therefrom and terminating in an upper peripheral rim, said wall having an outwardly projecting lip disposed below said rim, said peripheral wall having a pair of laterally spaced apart, vertically disposed, downwardly opening sockets on the exterior surface thereof and disposed below but terminating upwardly in close proximity to said lip, and a handle comprising an elongate, integrally formed element having the median portion thereof arcuately bent to define a bight portion engaging said lip, said bight portion having a pair of identically shaped legs extending first outwardly therefrom in side-by-side relation and then being arcuately bent downwardly and inwardly to define gripping portions, said legs thereafter being arcuately bent upwardly to define socket engaging portions projecting upwardly into said sockets, the bight portion of said handle cooperating with said socket engaging portions to engage said lip with a snap coupling effect for retaining said handle in engaging relation with said peripheral wall.

2. The receptacle of claim 1 wherein said wall flares slightly outwardly adjacent the upper marginal portion thereof and thereafter converges gradually to said upper rim to define an annular bulge which provides said lip.

3. The receptacle of claim 1, wherein said shell is comprised of spaced apart inner and outer shell portions joined together in sealed relationship to provide an insulated chamber therebetween, and wherein each of said sockets is connected in communicating relation with said insulated chamber, and including a pair of compressible closure elements each being interposed between the end of one of said socket engaging portions of said handle and the inner extremity of its associated socket for sealing said chamber from the exterior.

References Cited in the file of this patent

UNITED STATES PATENTS

| | | |
|---|---|---|
| 692,802 | Strope | Feb. 4, 1902 |
| 2,715,326 | Gits | Aug. 16, 1955 |

FOREIGN PATENTS

| | | |
|---|---|---|
| 168,112 | Great Britain | Aug. 26, 1921 |
| 401,107 | Great Britain | Nov. 9, 1933 |
| 444,421 | Great Britain | Mar. 20, 1936 |